UNITED STATES PATENT OFFICE.

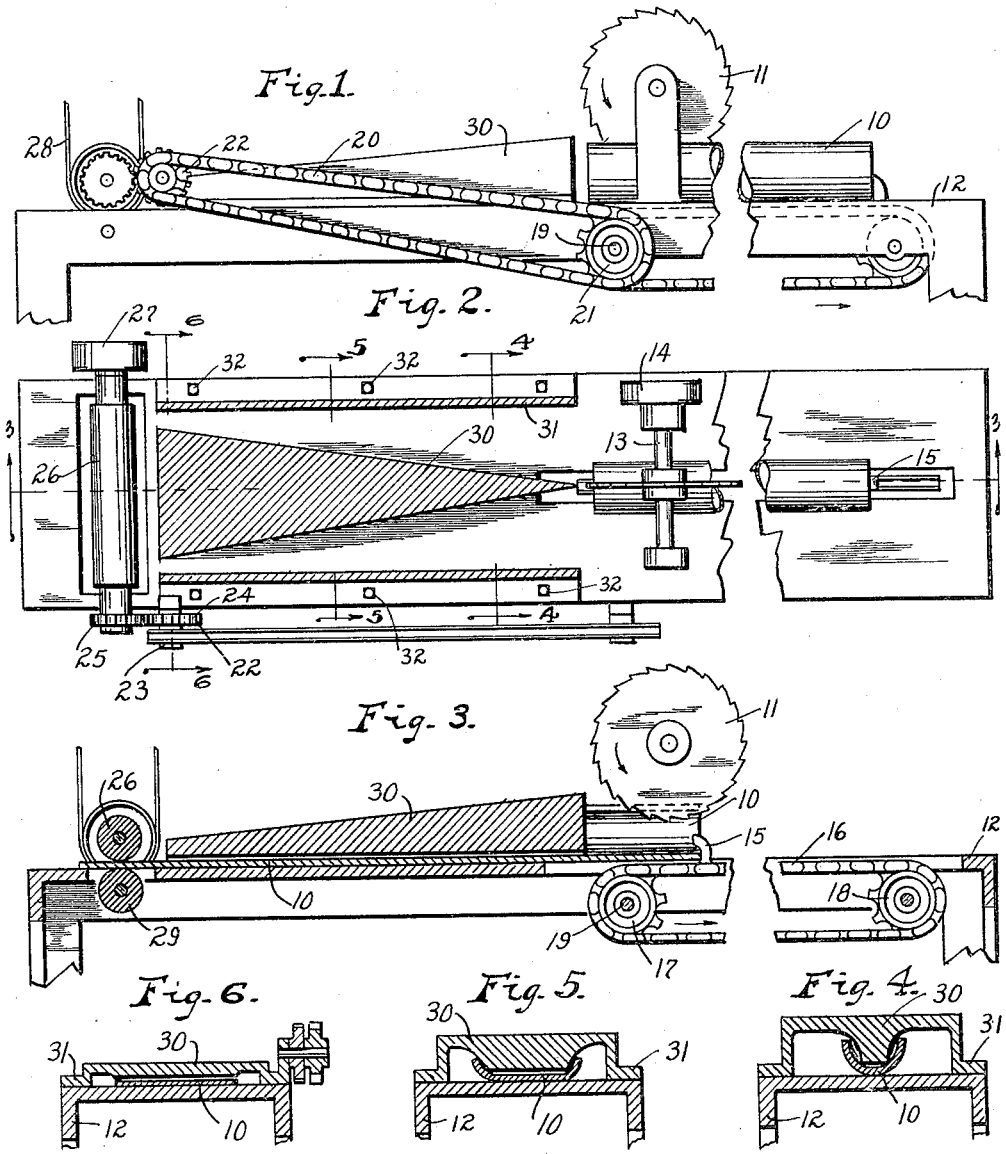

THOMAS W. WRIGHT, OF ANDERSON, INDIANA.

TUBE-CONVERTING MECHANISM.

1,133,903.  Specification of Letters Patent.  Patented Mar. 30, 1915.

Application filed April 14, 1913. Serial No. 761,010.

*To all whom it may concern:*

Be it known that I, THOMAS W. WRIGHT, a citizen of the United States, and a resident of Anderson, county of Madison, and State of Indiana, have invented a certain new and useful Tube - Converting Mechanism; and I do hereby declare that the following is a full, clear, and exact description thereof, reference being had to the accompanying drawings, in which like letters refer to like parts.

The object of this invention is to provide a practical and satisfactory mechanism for converting metal tubes into flat strips, so that they can be worked up into any desired form.

The chief feature of the invention consists in providing means for sawing or otherwise longitudinally splitting or separating one side of the tube and spreading the tube, preferably at the same time as the splitting, by a wedge-shaped die or the like, either forcing the tube into engagement with the wedge-shaped die or the reverse and thereafter passing the substantially flattened sheet between rolls for making it perfectly flat.

Another feature of the invention consists in associating said parts so that they will coöperate, and providing means for feeding the tube through the saw and partially past the wedge-shaped die and to rolls, and arranging the rolls so that they will perform two functions, rolling the flattened sheet, and drawing it past the wedge-shaped die and disengaging it from the original feeding means.

Along with the foregoing is the peculiar formation of the die somewhat like a double plow share, whereby the two sides of the split tube will be gradually turned over and down and flattened as well as spread. In other words, the wedge-shaped die at its sharp end is substantially vertical and as it widens, the die is gradually changed from the vertical to a horizontal form so as to break down the sides of the tube.

The full nature of the invention will be understood from the accompanying drawings and the following description and claims.

In the drawings, Figure 1 is a side elevation of the device with parts broken away. Fig. 2 is a plan view of the device partially broken away and with the spreading die shown in horizontal section. Fig. 3 is a central vertical section through the device on the line 3—3 of Fig. 2. Figs. 4, 5 and 6 are sections on the lines 4—4, 5—5 and 6—6 of Fig. 2, respectively.

In operating a tube 10 to convert it into a flat, the tubing should preferably be heated, but not sufficiently to injure the saw 11. There is a table 12 upon which the tube 10 is placed and fed longitudinally to the saw. The saw is mounted on a shaft or arbor 13 and driven by a belt, not shown, running to a pulley 14 and preferably in the direction indicated by the arrow, that is, in the direction opposite to the feeding movement of the tube 10. The saw is mounted so that it will split the upper side of the tube along a central longitudinal line, as shown in Fig. 3.

The tube is fed by a hooked arm 15 which engages the rear end of the tube and said arm is secured to a link of a sprocket chain 16 mounted on the sprocket wheels 17 and 18. The latter sprocket wheel is an idler. The former wheel is mounted on a shaft 19 and is driven in the direction indicated by the arrow.

The sprocket wheel or feeding means is driven by a sprocket chain 20 running from a sprocket wheel 21 on the shaft 19 and a sprocket wheel 22 on a stub shaft 23 which carries a spur gear 24 meshing with a spur gear 25 on the arbor of a roll 26. At the other end of said roll 26 there is a pulley 27 driven by a belt 28 extending from some suitable source of power. A roll 29 is located in a frame beneath the roll 26 and coöperates therewith in flattening and moving the sheet of metal into which the tube is being converted.

The rolls 26 and 29 are spaced away from the saw for considerable distance and in between said parts a spreading die 30 is located, it having lateral downwardly extending flanges 31 on the opposite sides thereof and extending longitudinally of the table and secured to the table by bolts 32. The length of this die structure is shown in Figs. 1 and 2, while the nature of the same transversely is indicated in Figs. 4, 5 and 6. It is shown as a solid structure, but may be made in any desired way provided it be very strongly built and mounted as it is subject to considerable strain, particularly the central or die portion thereof. The upper part of the die structure is flat on top and slopes downwardly from the saw position to the rolls. The central or die portion 30, as shown in Fig. 2, is wedge-shaped longitudinally, having a sharp point near the saw and in alinement with the saw and gradually widening as it approaches the rolls 26 and 29. Also the central or die portion 30 is maintained elevated somewhat above the table 10, as shown in Figs. 4, 5 and 6, so that the lower part of the tube 10 may move under the die. At the apex of the die the sides thereof are substantially vertical, but from the apex toward the widened end of the die, the sides are gradually curved more and more toward a horizontal position, somewhat like a plow share, and as shown in Figs. 4, 5 and 6, so as to break down and turn over laterally the sides of the tube as it is forced along the die. Hence, the sides of the die are changed gradually from the vertical to a horizontal position, as shown in Fig. 6.

The operation of the device is as follows: A tube is placed on the table centrally in line with the saw and the hook 15 is placed over the rear end thereof and thereby the tube is fed to the saw. After the forward end of the tube has passed the saw and has been split centrally and longitudinally on its upper side, it reaches the apex of the wedge-shaped die. The lower part of the tube passes under the die, but the split sides of the tube pass on the opposite sides of the die. Since the die widens gradually, the further movement of the tube will cause the sides of the tube to be broken down and spread laterally by the die. And as the tube proceeds, the sides of the die which are curved more and more from a vertical to a horizontal position, flatten down the tube so that by the time the tube issues from the die, it will be substantially flat and will then enter between the rolls 26 and 29. This will flatten the metal and also the rolls will grip and draw the metal during the rest of its movement through the device. The chain carrying the feeding hook 15 is so located that the hook will leave the tube after the tube has passed the saw. The rolls 26 and 29 are so located also with reference to the saw and feed hook 15 that they will grasp the flattened plate into which the tube has been converted, just before the tube has left the hook 15. The rolls are geared so as to run more rapidly than the sprocket wheels on which the chain 16 is mounted. Therefore, said rolls will quickly advance the tube so that it will disengage the hook 15 and permit it to travel on down past the sprocket wheel 17 and return on the underside of the sprocket chain 16. Since the tube has now been split and has passed the initial spreading during which it has required the greatest amount of power to move the tube past the die, the rolls 26 and 29 are sufficient to complete the movement of the tube and as it issues from the rolls, it will be substantially a flat and then can be reheated and put into other rolls and formed into any desired shape, just like any other flat strip of metal.

The invention is not limited to the details of the drawing shown herein which merely illustrates the general nature of the invention and the details can be modified by the workmen to suit their desires. The invention is not limited to the saw for splitting the tube, as possibly some other means might be employed for that purpose. Nor is it limited to the particular means shown for conveying the tube to the die, nor to the exact construction of the die.

I claim as my invention:

1. A machine for converting metal tubes into flat strips including a wedge-shaped die for laterally spreading the sides of a tube which has been split longitudinally, and rolls between which the flattened form of the tube passes while being acted on by the die, whereby the roll both flattens and feeds the tube.

2. A machine for converting metal tubes into flat strips including a wedge-shaped die for laterally spreading the sides of a tube which has been split longitudinally, rolls in alinement with the die and between which the flattened advance end of the tube passes after leaving the die and while the succeeding part of the tube is being spread, and means for driving one of said rolls.

3. A machine for converting metal tubes into flat strips including rotary means for longitudinally splitting the tube on one side thereof, a stationary die adjacent to and in alinement with the said splitting means for spreading the tube, rolls following and adjacent to and in alinement with said spreader between which the flattened form of the tube may pass as it leaves the die, means for operating the said rolls, and means for feeding the tube longitudinally to said splitting means, spreading means and rolls.

4. A machine for converting metal tubes into flat strips including a wedge-shaped die for laterally spreading the sides of a tube which has been split longitudinally, rolls between which the flattened form of the tube passes after leaving the die, means for feeding the tube to the die until it has been grasped by said rolls, and means for driving one of said rolls.

5. A machine for converting metal tubes into flat strips including a wedge-shaped die for laterally spreading the sides of a tube which has been split longitudinally, rolls between which the flattened form of the tube passes after leaving the die, means for feeding the tube to the die until it has been grasped by said rolls, and means for driving said feeding means and said rolls so that the rolls will move the metal faster than the feeding means.

6. A machine for converting metal tubes into flat strips including a wedge-shaped die for spreading the sides of a tube which has been longitudinally split, an endless chain, a hook thereon for engaging the rear end of the tube and feeding it to the die, rolls for receiving the metal as it leaves the die, and means for driving said feeding means and said rolls so that the rolls will move the metal faster than the feeding means.

7. A machine for converting metal tubes into flat strips including a wedge-shaped die, a saw mounted near and in alinement with the apex of the die, rolls mounted near the other end of the die, means for feeding a tube longitudinally to the saw and die and rolls, and means for driving said feeding means and said rolls so that the rolls will move the metal faster than the feeding means.

8. A machine for converting metal tubes into flat strips including a table longitudinally slotted, a wedge-shaped die secured thereon and with the die portion spaced therefrom and with the apex in alinement with said slot, a saw near and in alinement with the apex of the die, rolls near the other end of the die, an endless chain mounted beneath the table with an arm projecting through said slot for engaging the rear end of the tube, and feeding it to the saw and die and rolls, and means for driving said feeding means and said rolls so that the rolls will move the metal faster than the feeding means.

In witness whereof, I have hereunto affixed my signature in the presence of the witnesses herein named.

THOMAS W. WRIGHT.

Witnesses:
J. H. WELLS,
O. M. McLAUGHLIN.

Copies of this patent may be obtained for five cents each, by addressing the "Commissioner of Patents, Washington, D. C."